United States Patent
Windpassinger et al.

(10) Patent No.: US 6,471,283 B2
(45) Date of Patent: Oct. 29, 2002

(54) WINDOW MOUNT FOR MOTOR-VEHICLE SOFT TOP

(75) Inventors: Martin Windpassinger, Hauzenberg (DE); Heinrich Krieg, Neureichenau (DE)

(73) Assignee: Parat Automotive Schonenbach GmbH & Co. KG, Remscheid (DE)

( * ) Notice: Subject to any disclaimer, the term of this patent is extended or adjusted under 35 U.S.C. 154(b) by 0 days.

(21) Appl. No.: 09/906,471

(22) Filed: Jul. 16, 2001

(65) Prior Publication Data
US 2002/0047290 A1 Apr. 25, 2002

Related U.S. Application Data

(62) Division of application No. 09/535,479, filed on Mar. 24, 2000, now abandoned.

(30) Foreign Application Priority Data

Mar. 30, 1999 (DE) .......................................... 199 14 599
Feb. 21, 2000 (DE) .......................................... 100 07 575

(51) Int. Cl.$^7$ ................................. B60J 7/12; B60J 1/18
(52) U.S. Cl. ............................... 296/146.14; 296/107.07
(58) Field of Search ............................ 296/201, 146.14, 296/146.15, 107.07, 145

(56) References Cited

U.S. PATENT DOCUMENTS

| 1,278,556 | A | * | 9/1918 | Anderson | 296/145 |
| 5,464,265 | A | * | 11/1995 | Hemmis et al. | 296/146.14 |
| 5,558,390 | A | * | 9/1996 | Hemmis et al. | 296/146.14 |
| 6,015,181 | A | * | 1/2000 | Exner | 296/145 |
| 6,152,518 | A | * | 11/2000 | Schonenbach | 296/146.14 X |

FOREIGN PATENT DOCUMENTS

| DE | 669585 | * | 12/1938 | 296/145 |
| GB | 503371 | * | 5/1939 | 296/145 |

* cited by examiner

*Primary Examiner*—D. Glenn Dayoan
*Assistant Examiner*—Patricia Engle
(74) *Attorney, Agent, or Firm*—Herbert Dubno; Andrew Wilford

(57) ABSTRACT

A motor-vehicle soft top has a soft-top outer material having an inner edge, an outside face, and an inside face. A glass pane has an outer edge extending along the pane inner edge, an outside face, and an inside face. The inner material edge and outer pane edge overlap each other. A cast plastic frame element extends along the material inner edge and has an outside face bonded to the inside face of the material inner edge. The profile is generally S- or Z-section, having an inside flange carrying the outer pane edge, an outside flange, and a web extending between the flanges. An adhesive strip between an outside face of the inside flange and the inside face of the outer pane edge secures the pane in place.

11 Claims, 6 Drawing Sheets

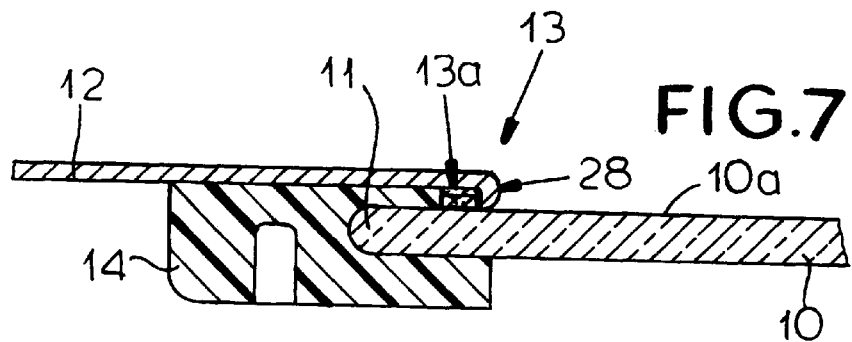
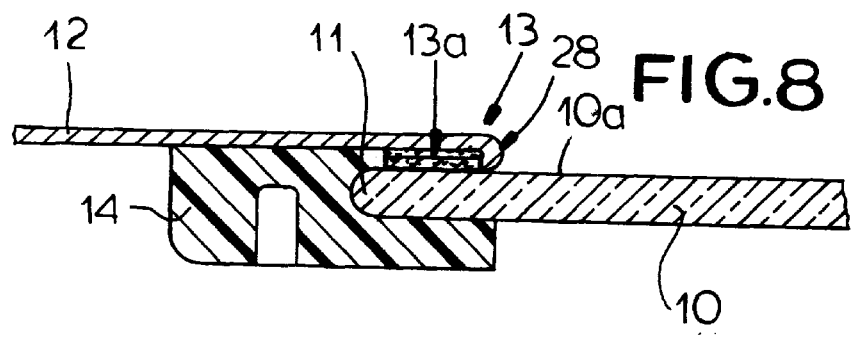
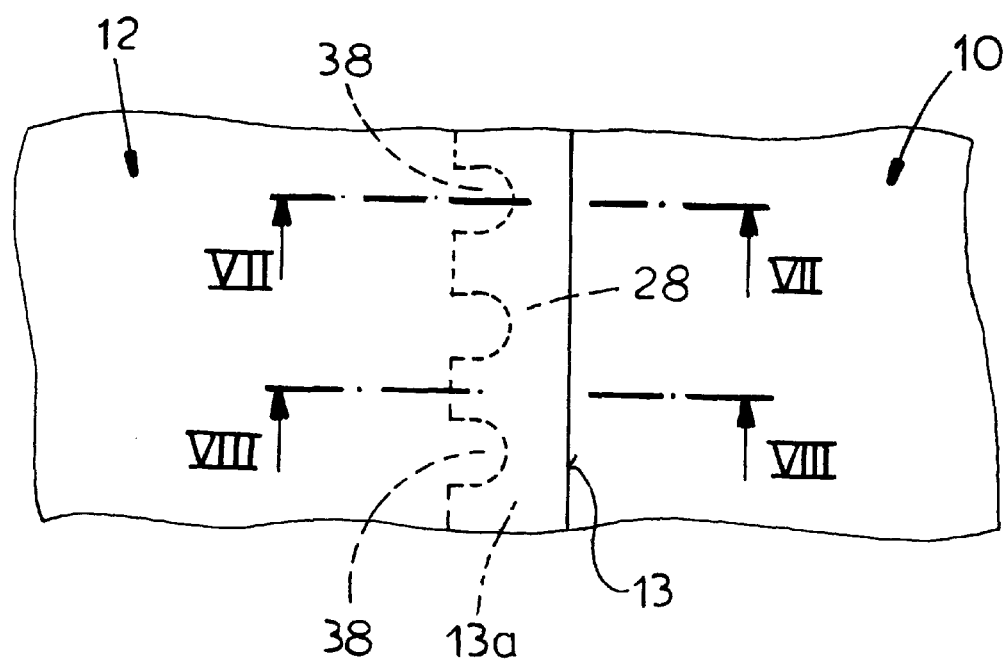

WINDOW MOUNT FOR MOTOR-VEHICLE SOFT TOP

CROSS REFERENCE TO RELATED APPLICATION

The present invention is a division of application Ser. No. 09/535,479 filed Mar. 24, 2000, now abandoned with a claim to the priority of German 199 14 599.7 filed Mar. 30, 1999 and German 100 07 575.4 filed 21 Feb. 2000.

FIELD OF THE INVENTION

The present invention relates to a motor-vehicle soft top, of the type used on a convertible. More particularly this invention concerns a system for mounting a rigid glass window in such a top.

BACKGROUND OF THE INVENTION

In copending U.S. patent application Ser. No. 09/088,219 a soft top for an automotive vehicle is described that comprises a structural element of a motor vehicle formed by a window having an edge and a soft-top surface element having an edge thinner than the edge of the window spacedly juxtaposed with the edge of the window and lying between planes of broad surfaces of the window flanking the edge of the window. The edges define a gap filled by a strip-shaped polyurethane cast resin element directly connecting the edges of the surface element and the window and forming beads of polyurethane cast resin along the surface element and the structural element in which the edges are embedded. The beads have continuous rounded contours at the gap bridging the surfaces of the window and broad surfaces of the surface elements.

The considerable advantage of such a window-mounting system is that it eliminates the expensive stitching and other steps entailed in securing the window in the soft top, while producing a very neat and attractive appearance. The use of relatively hard polyurethane is advantageous in combination with a hard-glass window as opposed to a flexible plastic one.

It is important to mount the glass as flush as possible with the outer surface, even of a soft top. Furthermore the joint between the glass and the top should be as smooth as possible so as to reduce wind resistance and whistle and to avoid creation of a trap for liquid and dirt.

OBJECTS OF THE INVENTION

It is therefore an object of the present invention to provide an improved system for mounting a glass window in a motor-vehicle soft top.

Another object is the provision of such an improved system for mounting a glass window in a motor-vehicle soft top which overcomes the above-given disadvantages, that is which allows the glass to be mounted essentially flush with a minimal joint, and that allows the glass to be removed and replaced, if necessary.

SUMMARY OF THE INVENTION

A motor-vehicle soft top has according to the invention a soft-top outer material having an inner edge, an outside face, and an inside face. A glass pane has an outer edge extending along the pane inner edge, an outside face, and an inside face. The inner material edge and outer pane edge overlap each other. A cast plastic frame element extends along the material inner edge and has an outside face bonded to the inside face of the material inner edge.

The frame element according to the invention can be bonded exclusively to the inside face of the material inner edge. It is normally of cast polyurethane. Alternately the inner edge can be bonded directly with the glass pane. In addition the frame element can have a portion extending between and bonded to the outside face of the inner material edge and the inside face of the outer pane edge. In this case the portion engages around the inner material edge.

In accordance with the invention wherein the profile is generally S- or Z-section, having an inside flange carrying the outer pane edge, an outside flange, and a web extending between the flanges. An adhesive strip between an outside face of the inside flange and the inside face of the outer pane edge secures the pane solidly in place. In this arrangement the inside and outside flanges are offset by a distance equal to at least a thickness of the pane plus a thickness of the adhesive strip. Thus the pane is flush with or recessed in the top.

In another arrangement according to the invention the outside flange has an inside surface level with an inside surface of the inside flange. The adhesive strip can be a polyurethane adhesive or a high-frequency activated adhesive. The element is formed with a plurality of inwardly open pockets and the top has a roof liner having an inner edge provided with a stiffening bar having tabs engaged in the pockets. This makes for a very neat installation of the window, with the outside top material fitting snugly to it on the outside and the roof liner fitting snugly to it on the inside.

In another system in accordance with the invention the material inner edge is folded over and adhered to the outside pane face. This material inner edge is saturated with a high-frequency-activated adhesive by means of which it is adhered to the outside pane face. Furthermore the element extends into a space between the folded-over inner edge and the pane and is adhered thereto. In this case the folded-over inner edge is formed with a plurality of notches into which the element extends.

For a more rigid assembly a metal reinforcing bar is at least partially imbedded in the element. This bar forms an outside surface of the element and is normally perforated so it bonds well to the element. It overlaps the pane outer edge.

BRIEF DESCRIPTION OF THE DRAWING

The above and other objects, features, and advantages will become more readily apparent from the following description, reference being made to the accompanying drawing in which:

FIG. 6 is a top view of yet another joint according to the invention; and

FIGS. 7 and 8 are sections taken along respective lines VII—VII and VIII—VIII of FIG. 6.

SPECIFIC DESCRIPTION

Figure 1:
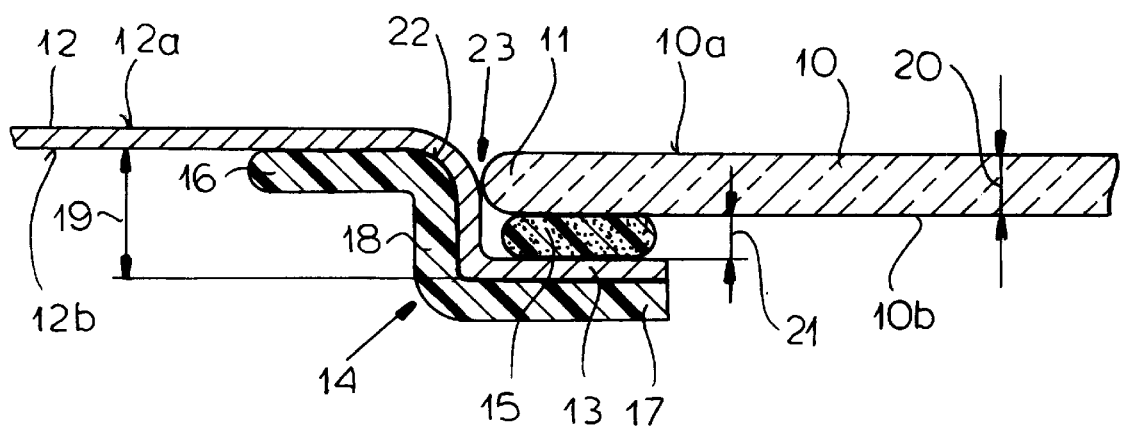
FIG. 1 is a section through a joint in a window mount according to the invention.

As seen in FIG. 1 a motor-vehicle glass window 10 has outside and inside faces 10a and 10b and an outer edge 11. Material 12, for instance a stiff but flexible canvas forming the outer surface of a motor-vehicle convertible top, is formed with an opening in which the glass 10 is set and has outside and inside surfaces 12a and 12b and an inner edge 13 bounding this opening. Normally the glass 10 is generally rectangular, with four straight sides and rounded corners.

According to the invention a S- or Z-section rigid polyurethane frame element 14 is secured to the inside face 12b at the edge. This frame element 14 has an outside flange 16, a parallel inside flange 17, and a web 18 interconnecting the two flanges 16 and 17. The transition between the outside flange 16 and web 18 is rounded at 22. The element 14 has a Shore D hardness of 40.

A bead or strip of a polyurethane adhesive 15 is provided between the inside face 10b of the outer edge 11 and the outside face of the edge 13 at the flange 17. An offset 19 between an outside face of the flange 17 and the inside face 12b is greater than a thickness 20 of the glass 10 and a thickness 21 of the adhesive strip 15.

The above-described assembly is made by fitting the edge 13 into a mold which bends it into the illustrated shape and that forms on its inside face 12b a chamber having the cross section of the element 14. This chamber is then filled with fluent polyurethane having 1% to 2% foaming capacity so as to mold this element 14 in situ onto the edge 13. Once it is cured, the glass 10 is fitted in place with the adhesive 15, forming a tight gap 23 between the edges 11 and 13. This gap 23 can be filled with the material of the element 14.

Figure 2:
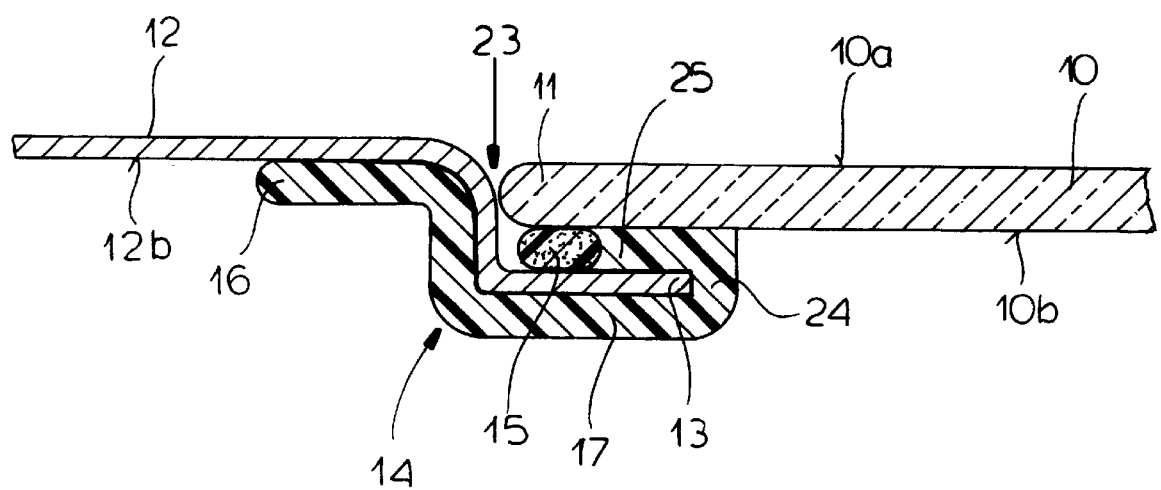
FIGS. 2, 3, 4, and 5 are sections through further joints in accordance with the invention.

The system of FIG. 2 is identical to that of FIG. 1 except that the inner edge of the inside flange 17 is formed with a web 24 from which extends another flange 25 that lies between the inside face 10b of the glass 10 and the outside face of the edge 13, inward of the adhesive/caulk strip 15. Such a system is also formed in situ, but after the glass 10 has been installed with its adhesive 15. The adhesive strip 15 therefore also serves the function of preventing the fluent mass of the element 14 from extruding out around the glass 10 during formation of the element 14. Furthermore the element 14, which still is mainly adhered to the inside face 12b of the outer roof material 12, is also adhered to the inside face 10b of the glass 10.

Figure 3:
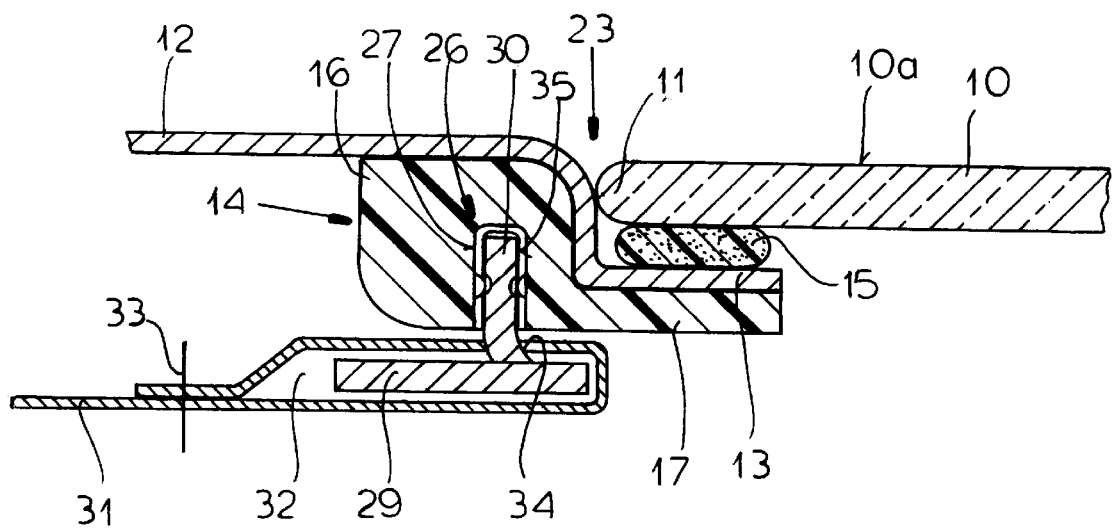

In the arrangement of FIG. 3 the flange 16 is thickened so its inside face is continuous with the inside face of the inside flange 17. The flange 16 has attachment formations 26 formed as row of pockets 27 lined with respective clips 35 and receiving respective tabs 30 of bars 29 held in a pocket 32 formed by a seam 33 at an outer edge of a roof liner 31. Holes 34 in the pockets 32 allow the tabs 30, which are bent out of the metal of the bar 29 (but which could be molded from a plastic bar) to project out of the pocket 32 and fit in the seats 27. This arrangement is similar to that described in U.S. patent application Ser. No. 09/514,617.

Figure 4:
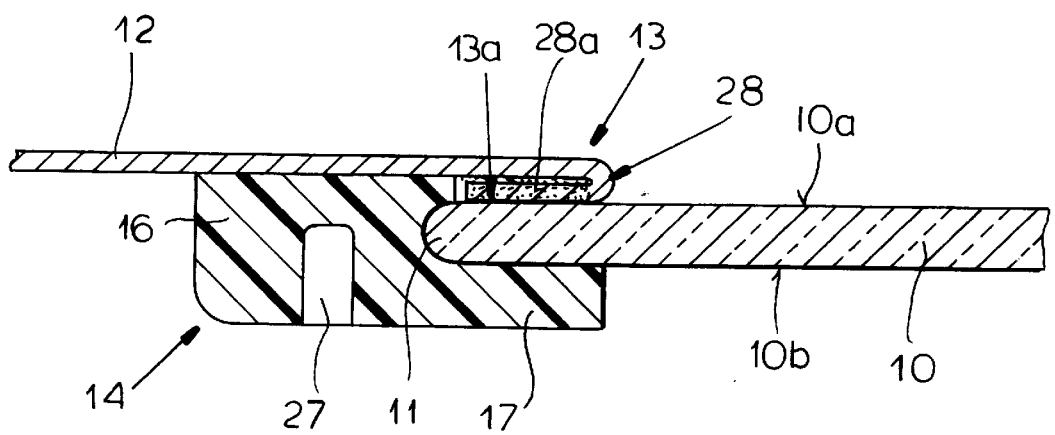

The system of FIG. 4 is like that of FIG. 3 except that the outer material 12 does not have an S- or Z-section inner edge 13. Instead its inner edge is straight and is folded over at 28. An inside face 13a of the folded-over edge 13 lies directly atop the outside face of the flange 17 and is there adhered to the outside glass face 10a. To this end the doubled portion 13a can be soaked with an adhesive activated by heat or high-frequency radiation.

Figure 5:
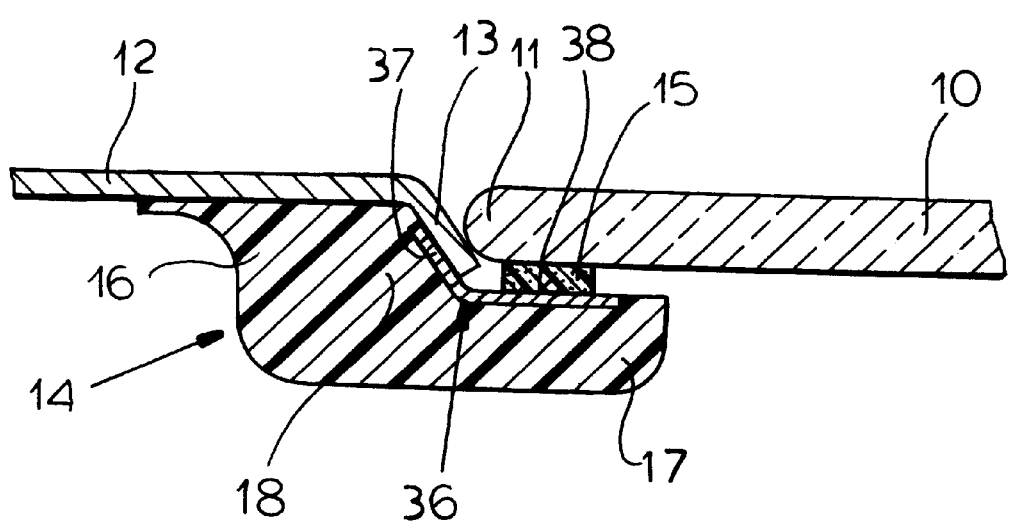

In FIG. 5 the frame element 14 is provided with an L-shaped metal reinforcement strip 36 having one leg lying on the outside face of the inside flange 17 and another flange 37 extending along the web 18 and engaging the inside face of the edge 13. Normally one such metal strip 36 is provided along each of the four straight edges of the window glass 10, not extending around the corners thereof so as to provide maximum reinforcement and stiffness with the simplest possible construction. The strip 36 is perforated, that is formed with rows of throughgoing holes, so that the material of the element 14 can engage through it.

FIGS. 6 to 8 show a system essentially identical to that of FIG. 4 except that the doubled-over edge 13a which is saturated with the adhesive is formed with outwardly open cutouts or notches 38. The material of the strip 14 is molded to flow into these cutouts 38 and bond to the outside face 10a of the glass 10 in these regions, providing a very solid mounting for the glass 10.

We claim:

1. A motor-vehicle soft top comprising:
   a soft-top outer material having an inner material edge, an outside material face, and an inside material face;
   a glass pane having an outer pane edge extending along and overlapping the material inner edge, an outside pane face, and an inside pane face; and
   a cast plastic frame element extending along the material inner edge and having an outside frame face bonded to the inside material face at the material inner edge and directly engaging the inside pane face and a portion extending between and bonded to the outside face of the inner material edge and the inside face of the outer pane edge.

2. The motor-vehicle soft top defined in claim 1 wherein the frame element is of cast polyurethane.

3. The motor-vehicle soft top defined in claim 1 wherein the portion engages around the inner material edge.

4. The motor-vehicle soft top defined in claim 1 wherein the element is formed with a plurality of inwardly open pockets, the top further comprising:
   a roof liner having an inner edge provided with a stiffening bar having tabs engaged in the pockets.

5. A motor-vehicle soft top comprising:
   a soft-top outer material having an inner material edge, an outside material face, and an inside material face;
   a glass pane having an outer pane edge extending along and overlapping the material inner edge, an outside pane face, and an inside pane face; and
   a cast plastic frame element extending along the material inner edge and having an outside frame face bonded to the inside material face at the material inner edge and directly engaging the inside pane face, the frame element being generally of S- or Z-section, having an inside flange carrying the outer pane edge, an outside flange, and a web extending between the flanges.

6. The motor-vehicle soft top defined in claim 5, further comprising
   an adhesive strip between an outside face of the inside flange and the inside pane face of the outer pane edge.

7. The motor-vehicle soft top defined in claim 6 wherein the adhesive strip is a polyurethane adhesive.

8. The motor-vehicle soft top defined in claim 6 wherein the adhesive strip is a high-frequency activated adhesive.

9. The motor-vehicle soft top defined in claim 5 wherein the inside and outside flanges are offset by a distance equal to at least a thickness of the pane plus a thickness of the adhesive strip.

10. The motor-vehicle soft top defined in claim 5 wherein the outside flange has an inside surface level with an outside surface of the inside flange.

11. A motor-vehicle soft top comprising:

a soft-top outer material having an inner material edge, an outside material face, and an inside material face;

a glass pane having an outer pane edge extending along and overlapping the material inner edge, an outside pane face, and an inside pane face; and a cast plastic frame element extending along the material inner edge and having an outside frame face bonded to the inside material face at the material inner edge and directly engaging the inside pane face, the frame element extending into a space between the pane inner face and the material outer face at the edges and being adhered thereto.

* * * * *